(12) United States Patent
Nonn et al.

(10) Patent No.: US 12,261,988 B2
(45) Date of Patent: Mar. 25, 2025

(54) METHODS FOR GENERATING STEREOSCOPIC VIEWS IN MULTICAMERA SYSTEMS, AND ASSOCIATED DEVICES AND SYSTEMS

(71) Applicant: Proprio, Inc., Seattle, WA (US)

(72) Inventors: Thomas Ivan Nonn, Kenmore, WA (US); David Julio Colmenares, Seattle, WA (US); Arun K. Paruchuri, San Jose, CA (US); Adam Gabriel Jones, Seattle, WA (US)

(73) Assignee: PROPRIO, INC., Seattle, WA (US)

( * ) Notice: Subject to any disclaimer, the term of this patent is extended or adjusted under 35 U.S.C. 154(b) by 0 days.

(21) Appl. No.: 17/521,235

(22) Filed: Nov. 8, 2021

(65) Prior Publication Data

US 2023/0147711 A1 May 11, 2023

(51) Int. Cl.
*H04N 13/111* (2018.01)
*G06T 3/4053* (2024.01)
(Continued)

(52) U.S. Cl.
CPC .......... *H04N 13/111* (2018.05); *G06T 3/4053* (2013.01); *G06T 7/11* (2017.01);
(Continued)

(58) Field of Classification Search
CPC .. H04N 13/111; H04N 13/128; H04N 13/139; H04N 13/239; H04N 13/243; H04N 13/246; H04N 13/344; H04N 13/383; G06T 3/4053; G06T 7/11; G06T 2207/20132; G06V 10/25
(Continued)

(56) References Cited

U.S. PATENT DOCUMENTS 4,383,170 A 5/1983 Takagi et al.
4,694,185 A 9/1987 Weiss
(Continued)

FOREIGN PATENT DOCUMENTS

CN 1672626 A 9/2005
CN 101742347 A 6/2010
(Continued)

OTHER PUBLICATIONS

International Search Report and Written Opinion received in Application No. PCT/US21/31653, dated Jun. 30, 2021, 17 pages.
(Continued)

*Primary Examiner* — Tung T Vo
(74) *Attorney, Agent, or Firm* — Perkins Coie LLP

(57) ABSTRACT

Methods for selecting pairs of cameras in a multicamera array configured to image a scene to generate stereoscopic views, and associated systems and devices, are disclosed herein. In some embodiments, a representative method includes selecting a pair of cameras in the multicamera array from which to generate a stereoscopic view, and receiving images of the scene from the selected pair of the cameras. The method further includes cropping the images based on a known calibration of the cameras and a desired disparity, and displaying the cropped images on a display device to generate the stereoscopic view. The desired disparity can correspond to an interpupillary distance of a user.

19 Claims, 10 Drawing Sheets

(51) Int. Cl.
*G06T 7/11* (2017.01)
*G06V 10/25* (2022.01)
*H04N 13/128* (2018.01)
*H04N 13/139* (2018.01)
*H04N 13/239* (2018.01)
*H04N 13/243* (2018.01)
*H04N 13/246* (2018.01)
*H04N 13/344* (2018.01)
*H04N 13/383* (2018.01)

(52) U.S. Cl.
CPC ............ *G06V 10/25* (2022.01); *H04N 13/128* (2018.05); *H04N 13/139* (2018.05); *H04N 13/239* (2018.05); *H04N 13/243* (2018.05); *H04N 13/246* (2018.05); *H04N 13/344* (2018.05); *H04N 13/383* (2018.05); *G06T 2207/20132* (2013.01)

(58) Field of Classification Search
USPC .......................................................... 348/48
See application file for complete search history.

(56) References Cited

U.S. PATENT DOCUMENTS

| | | | |
|---|---|---|---|
| 5,334,991 A | 8/1994 | Wells et al. | |
| 5,757,423 A | 5/1998 | Tanaka et al. | |
| 5,876,325 A | 3/1999 | Mizuno et al. | |
| 5,905,525 A | 5/1999 | Ishibashi et al. | |
| 5,999,840 A | 12/1999 | Grimson et al. | |
| 6,483,535 B1 | 11/2002 | Tamburrino et al. | |
| 6,491,702 B2 | 12/2002 | Heilbrun et al. | |
| 6,577,342 B1 | 6/2003 | Wester | |
| 6,675,040 B1 | 1/2004 | Cosman | |
| 6,985,765 B2 | 1/2006 | Morita et al. | |
| 8,010,177 B2 | 8/2011 | Csavoy et al. | |
| 8,041,089 B2 | 10/2011 | Drumm et al. | |
| 8,179,604 B1 | 5/2012 | Prada Gomez et al. | |
| 8,295,909 B2 | 10/2012 | Goldbach | |
| 8,384,912 B2 | 2/2013 | Charny et al. | |
| 8,548,563 B2 | 10/2013 | Simon et al. | |
| 8,657,809 B2 | 2/2014 | Schoepp | |
| 8,885,177 B2 | 11/2014 | Ben-yishai et al. | |
| 8,914,472 B1 | 12/2014 | Lee et al. | |
| 8,933,935 B2 | 1/2015 | Yang et al. | |
| 9,119,670 B2 | 9/2015 | Yang et al. | |
| 9,220,570 B2 | 12/2015 | Kim et al. | |
| 9,237,338 B1 | 1/2016 | Maguire, Jr. | |
| 9,323,325 B2 | 4/2016 | Perez et al. | |
| 9,436,993 B1 * | 9/2016 | Stolka ..................... A61B 5/067 | |
| 9,462,164 B2 | 10/2016 | Venkataraman et al. | |
| 9,497,380 B1 | 11/2016 | Jannard et al. | |
| 9,503,709 B2 | 11/2016 | Shi et al. | |
| 9,513,113 B2 | 12/2016 | Yang et al. | |
| 9,618,621 B2 | 4/2017 | Barak et al. | |
| 9,916,691 B2 | 3/2018 | Takano et al. | |
| 9,918,066 B2 | 3/2018 | Schneider et al. | |
| 9,967,475 B2 | 5/2018 | Schneider et al. | |
| 10,074,177 B2 | 9/2018 | Piron et al. | |
| 10,089,737 B2 | 10/2018 | Krieger et al. | |
| 10,165,981 B2 | 1/2019 | Schoepp | |
| 10,166,078 B2 | 1/2019 | Sela et al. | |
| 10,166,079 B2 | 1/2019 | McLachlin et al. | |
| 10,194,131 B2 | 1/2019 | Casas | |
| 10,244,991 B2 | 4/2019 | Shademan et al. | |
| 10,345,582 B2 | 7/2019 | Schneider et al. | |
| 10,353,219 B1 | 7/2019 | Hannford et al. | |
| 10,390,887 B2 | 8/2019 | Bischoff et al. | |
| 10,398,514 B2 | 9/2019 | Ryan et al. | |
| 10,424,118 B2 | 9/2019 | Hannemann et al. | |
| 10,426,345 B2 | 10/2019 | Shekhar et al. | |
| 10,426,554 B2 | 10/2019 | Siewerdsen et al. | |
| 10,433,916 B2 | 10/2019 | Schneider et al. | |
| 10,455,218 B2 | 10/2019 | Venkataraman et al. | |
| 10,546,423 B2 | 1/2020 | Jones et al. | |
| 10,575,906 B2 | 3/2020 | Wu | |
| 10,650,573 B2 | 5/2020 | Youngquist et al. | |
| 10,653,495 B2 | 5/2020 | Gregerson et al. | |
| 10,657,664 B2 | 5/2020 | Yu | |
| 10,664,903 B1 | 5/2020 | Haitani et al. | |
| 10,667,868 B2 | 6/2020 | Malackowski | |
| 10,682,188 B2 | 6/2020 | Leung et al. | |
| 10,792,110 B2 | 10/2020 | Leung et al. | |
| 10,799,315 B2 | 10/2020 | Leung et al. | |
| 10,799,316 B2 | 10/2020 | Sela et al. | |
| 10,810,799 B2 | 10/2020 | Tepper et al. | |
| 10,828,114 B2 | 11/2020 | Abhari et al. | |
| 10,832,408 B2 | 11/2020 | Srimohanarajah et al. | |
| 10,918,444 B2 | 2/2021 | Stopp et al. | |
| 10,925,465 B2 | 2/2021 | Tully et al. | |
| 10,949,986 B1 * | 3/2021 | Colmenares ......... H04N 23/698 | |
| 10,973,581 B2 | 4/2021 | Mariampillai et al. | |
| 11,179,218 B2 | 11/2021 | Calef et al. | |
| 11,295,460 B1 | 4/2022 | Aghdasi et al. | |
| 11,303,823 B2 | 4/2022 | Youngquist et al. | |
| 11,354,810 B2 | 6/2022 | Colmenares et al. | |
| 11,612,307 B2 | 3/2023 | Smith et al. | |
| 2001/0048732 A1 | 12/2001 | Wilson et al. | |
| 2002/0065461 A1 | 5/2002 | Cosman | |
| 2002/0075201 A1 | 6/2002 | Sauer et al. | |
| 2002/0077533 A1 | 6/2002 | Bieger et al. | |
| 2002/0082498 A1 | 6/2002 | Wendt et al. | |
| 2002/0113756 A1 | 8/2002 | Tuceryan et al. | |
| 2003/0209096 A1 | 11/2003 | Pandey et al. | |
| 2003/0210812 A1 | 11/2003 | Khamene et al. | |
| 2003/0227470 A1 | 12/2003 | Genc et al. | |
| 2003/0227542 A1 | 12/2003 | Zhang et al. | |
| 2004/0070823 A1 | 4/2004 | Radna et al. | |
| 2004/0169673 A1 | 9/2004 | Crampe et al. | |
| 2005/0046700 A1 | 3/2005 | Bracke | |
| 2005/0070789 A1 | 3/2005 | Aferzon | |
| 2005/0090730 A1 | 4/2005 | Cortinovis et al. | |
| 2005/0203380 A1 | 9/2005 | Sauer et al. | |
| 2005/0206583 A1 | 9/2005 | Lemelson et al. | |
| 2006/0203959 A1 | 9/2006 | Spartiotis et al. | |
| 2007/0046776 A1 | 3/2007 | Yamaguchi et al. | |
| 2007/0121423 A1 | 5/2007 | Rioux | |
| 2007/0236514 A1 | 10/2007 | Agustano et al. | |
| 2008/0004533 A1 | 1/2008 | Heukensfeldt et al. | |
| 2008/0064952 A1 | 3/2008 | Li et al. | |
| 2009/0033588 A1 | 2/2009 | Kajita et al. | |
| 2009/0085833 A1 | 4/2009 | Otsuki | |
| 2009/0303321 A1 | 12/2009 | Olson et al. | |
| 2010/0045783 A1 | 2/2010 | State et al. | |
| 2010/0076306 A1 | 3/2010 | Daigneault et al. | |
| 2010/0099981 A1 | 4/2010 | Fishel | |
| 2010/0295924 A1 | 11/2010 | Miyatani et al. | |
| 2010/0329358 A1 | 12/2010 | Zhang et al. | |
| 2011/0015518 A1 | 1/2011 | Schmidt et al. | |
| 2011/0098553 A1 | 4/2011 | Robbins et al. | |
| 2011/0115886 A1 | 5/2011 | Nguyen et al. | |
| 2012/0050562 A1 | 3/2012 | Perwass et al. | |
| 2012/0068913 A1 | 3/2012 | Bar-Zeev et al. | |
| 2012/0218301 A1 | 8/2012 | Miller | |
| 2013/0002827 A1 | 1/2013 | Lee et al. | |
| 2013/0050432 A1 | 2/2013 | Perez et al. | |
| 2013/0058591 A1 | 3/2013 | Nishiyama et al. | |
| 2013/0076863 A1 | 3/2013 | Rappel et al. | |
| 2013/0084970 A1 | 4/2013 | Geisner et al. | |
| 2013/0088489 A1 | 4/2013 | Schmeitz et al. | |
| 2013/0135180 A1 | 5/2013 | McCulloch et al. | |
| 2013/0135515 A1 | 5/2013 | Abolfadl et al. | |
| 2013/0141419 A1 | 6/2013 | Mount et al. | |
| 2013/0222369 A1 | 8/2013 | Huston et al. | |
| 2013/0265485 A1 | 10/2013 | Kang et al. | |
| 2013/0274596 A1 | 10/2013 | Azizian et al. | |
| 2013/0307855 A1 | 11/2013 | Lamb et al. | |
| 2013/0335600 A1 | 12/2013 | Gustavsson et al. | |
| 2014/0005485 A1 | 1/2014 | Tesar et al. | |
| 2014/0031668 A1 | 1/2014 | Mobasser et al. | |
| 2014/0092281 A1 | 4/2014 | Nisenzon et al. | |
| 2014/0192187 A1 | 7/2014 | Atwell et al. | |
| 2014/0232831 A1 | 8/2014 | Shi et al. | |

(56) References Cited

U.S. PATENT DOCUMENTS

| | | |
|---|---|---|
| 2014/0375772 A1 | 12/2014 | Gabara |
| 2015/0049167 A1 | 2/2015 | Suzuki et al. |
| 2015/0055929 A1 | 2/2015 | Van Hoff et al. |
| 2015/0173846 A1 | 6/2015 | Schneider et al. |
| 2015/0201176 A1 | 7/2015 | Graziosi et al. |
| 2015/0244903 A1 | 8/2015 | Adams |
| 2015/0348580 A1 | 12/2015 | Van Hoff et al. |
| 2015/0373266 A1 | 12/2015 | Hsieh et al. |
| 2016/0073080 A1 | 3/2016 | Wagner et al. |
| 2016/0080734 A1 | 3/2016 | Aguirre-Valencia |
| 2016/0091705 A1 | 3/2016 | Ben Ezra et al. |
| 2016/0191815 A1 | 6/2016 | Annau et al. |
| 2016/0191887 A1* | 6/2016 | Casas ............... H04N 13/279 348/47 |
| 2016/0217760 A1* | 7/2016 | Chu ............... H04N 13/161 |
| 2016/0225192 A1 | 8/2016 | Jones et al. |
| 2016/0253809 A1 | 9/2016 | Cole et al. |
| 2016/0307372 A1 | 10/2016 | Pitts et al. |
| 2016/0317035 A1 | 11/2016 | Hendriks et al. |
| 2016/0352982 A1 | 12/2016 | Weaver et al. |
| 2017/0007334 A1 | 1/2017 | Crawford et al. |
| 2017/0068081 A1 | 3/2017 | Kirayama |
| 2017/0085855 A1* | 3/2017 | Roberts ............... A61B 5/377 |
| 2017/0099479 A1* | 4/2017 | Browd ............... G06F 3/011 |
| 2017/0109931 A1 | 4/2017 | Knorr et al. |
| 2017/0167702 A1 | 6/2017 | Mariampillai et al. |
| 2017/0172670 A1 | 6/2017 | Swarup et al. |
| 2017/0186183 A1 | 6/2017 | Armstrong et al. |
| 2017/0188011 A1 | 6/2017 | Panescu et al. |
| 2017/0202626 A1 | 7/2017 | Kula et al. |
| 2017/0237971 A1 | 8/2017 | Pitts |
| 2017/0296293 A1 | 10/2017 | Mak et al. |
| 2017/0318235 A1* | 11/2017 | Schneider ............... H04N 5/272 |
| 2017/0359565 A1 | 12/2017 | Ito |
| 2018/0012413 A1 | 1/2018 | Jones et al. |
| 2018/0018827 A1 | 1/2018 | Stafford et al. |
| 2018/0070009 A1* | 3/2018 | Baek ............... H04N 5/23232 |
| 2018/0078316 A1 | 3/2018 | Schaewe et al. |
| 2018/0082482 A1 | 3/2018 | Motta et al. |
| 2018/0091796 A1 | 3/2018 | Nelson et al. |
| 2018/0097867 A1 | 4/2018 | Pang et al. |
| 2018/0239948 A1 | 8/2018 | Rutschman et al. |
| 2018/0263706 A1 | 9/2018 | Averbuch |
| 2018/0263707 A1 | 9/2018 | Sela et al. |
| 2018/0263710 A1 | 9/2018 | Sakaguchi et al. |
| 2018/0293744 A1 | 10/2018 | Yu |
| 2018/0302572 A1 | 10/2018 | Barnes |
| 2019/0038362 A1 | 2/2019 | Nash et al. |
| 2019/0058870 A1* | 2/2019 | Rowell ............... H04N 9/8227 |
| 2019/0080519 A1 | 3/2019 | Osman |
| 2019/0094545 A1 | 3/2019 | Lo et al. |
| 2019/0158799 A1 | 5/2019 | Gao et al. |
| 2019/0158813 A1* | 5/2019 | Rowell ............... H04N 5/23267 |
| 2019/0183584 A1 | 6/2019 | Schneider et al. |
| 2019/0209080 A1 | 7/2019 | Gullotti et al. |
| 2019/0235210 A1 | 8/2019 | Nakai |
| 2019/0260930 A1 | 8/2019 | Van Hoff et al. |
| 2019/0282307 A1 | 9/2019 | Azizian et al. |
| 2019/0289284 A1* | 9/2019 | Smith ............... A61B 34/20 |
| 2019/0290366 A1 | 9/2019 | Pettersson et al. |
| 2019/0328465 A1 | 10/2019 | Li et al. |
| 2019/0336222 A1 | 11/2019 | Schneider et al. |
| 2019/0350658 A1 | 11/2019 | Yang et al. |
| 2020/0005521 A1 | 1/2020 | Youngquist et al. |
| 2020/0059640 A1 | 2/2020 | Browd et al. |
| 2020/0060523 A1 | 2/2020 | Matsuda et al. |
| 2020/0084430 A1 | 3/2020 | Kalarn et al. |
| 2020/0105065 A1 | 4/2020 | Youngquist et al. |
| 2020/0154049 A1 | 5/2020 | Steuart |
| 2020/0170718 A1 | 6/2020 | Peine |
| 2020/0197100 A1 | 6/2020 | Leung et al. |
| 2020/0197102 A1 | 6/2020 | Shekhar et al. |
| 2020/0242755 A1 | 7/2020 | Schneider et al. |
| 2020/0261297 A1* | 8/2020 | Strydom ............... G06T 7/60 |
| 2020/0296354 A1* | 9/2020 | Bickerstaff ............ G02B 27/017 |
| 2020/0297427 A1 | 9/2020 | Cameron et al. |
| 2020/0329226 A1 | 10/2020 | Medal et al. |
| 2020/0342673 A1* | 10/2020 | Lohr ............... G02B 27/0172 |
| 2020/0352651 A1 | 11/2020 | Junio et al. |
| 2020/0405433 A1 | 12/2020 | Sela et al. |
| 2021/0037232 A1* | 2/2021 | Lin ............... H04N 13/239 |
| 2021/0038340 A1 | 2/2021 | Itkowitz et al. |
| 2021/0045618 A1 | 2/2021 | Stricko et al. |
| 2021/0045813 A1 | 2/2021 | Wickham et al. |
| 2021/0077195 A1 | 3/2021 | Saeidi et al. |
| 2021/0145517 A1 | 5/2021 | Pierrepont et al. |
| 2021/0186355 A1 | 6/2021 | Ben-yishai et al. |
| 2021/0186632 A1 | 6/2021 | Quaid et al. |
| 2021/0192763 A1 | 6/2021 | Liu et al. |
| 2021/0196385 A1 | 7/2021 | Shelton et al. |
| 2021/0382559 A1 | 12/2021 | Segev et al. |
| 2022/0012954 A1 | 1/2022 | Buharin |
| 2022/0020160 A1 | 1/2022 | Buharin |
| 2022/0174261 A1* | 6/2022 | Hornstein ............... G06N 20/00 |

FOREIGN PATENT DOCUMENTS

| | | |
|---|---|---|
| CN | 104918572 A | 9/2015 |
| CN | 204854653 U | 12/2015 |
| EP | 1027627 A1 | 8/2000 |
| EP | 1504713 B1 | 7/2008 |
| EP | 2139419 A0 | 1/2010 |
| EP | 2372999 A1 | 10/2011 |
| EP | 3077956 A4 | 4/2017 |
| EP | 1924197 B1 | 10/2017 |
| EP | 3197382 A4 | 6/2018 |
| EP | 2852326 B1 | 12/2018 |
| EP | 3102141 B1 | 8/2019 |
| EP | 3076892 B1 | 10/2019 |
| EP | 2903551 A2 | 11/2021 |
| EP | 3824621 A4 | 4/2022 |
| IL | 262619 A | 4/2020 |
| JP | 2007-528631 A | 10/2007 |
| JP | 2011-0248723 A | 12/2011 |
| JP | 2015-524202 A | 8/2015 |
| WO | 2001005161 A1 | 1/2001 |
| WO | 2003002011 A1 | 1/2003 |
| WO | 2005081547 A1 | 9/2005 |
| WO | 2007115825 A1 | 10/2007 |
| WO | 2008130354 A1 | 10/2008 |
| WO | 2008130355 A1 | 10/2008 |
| WO | 2010067267 A1 | 6/2010 |
| WO | 2013082387 A1 | 6/2013 |
| WO | 2013180748 A1 | 12/2013 |
| WO | 2014037953 A2 | 3/2014 |
| WO | 2015084462 A1 | 6/2015 |
| WO | 2015151447 A1 | 10/2015 |
| WO | 2015179446 A1 | 11/2015 |
| WO | 2016044934 A1 | 3/2016 |
| WO | 2017042171 A1 | 3/2017 |
| WO | 2018097831 A1 | 5/2018 |
| WO | 2020018931 A1 | 1/2020 |
| WO | 2020069403 A1 | 4/2020 |
| WO | 2020163316 A1 | 8/2020 |
| WO | 2021003401 A1 | 1/2021 |
| WO | 2021231337 A1 | 11/2021 |

OTHER PUBLICATIONS

European Patent Office, Extended European Search Report and Opinion, EP Patent Application No. 19864255.5, Jun. 14, 2022, eight pages.

PCT International Search Report and Written Opinion, PCT Application No. PCT/US19/53300, Dec. 19, 2019, 15 pages.

United States Office Action, U.S. Appl. No. 16/808,194, filed May 13, 2021, eight pages.

U.S. Appl. No. 16/457,780, titled "Synthesizing an Image From a Virtual Perspective Using Pixels From a Physical Imager Array Weighted Based on Depth Error Sensitivity," and filed Jun. 28, 2019.

U.S. Appl. No. 17/140,885, titled "Methods and Systems for Registering Preoperative Image Data to Intraoperative Image Data of a Scene, Such as a Surgical Scene," and filed Jan. 4, 2021.

(56) References Cited

OTHER PUBLICATIONS

International Search Report and Written Opinion mailed Aug. 18, 2015 in corresponding International Application No. PCT/US2015/031637, 11 pages.
International Search Report and Written Opinion mailed Nov. 18, 2021 in corresponding International Application No. PCT/US2021/031653, 2 pages.
Extended European Search Report mailed Dec. 8, 2017 in European Patent Application No. 15795790.3 10 pages.
Extended European Search Report mailed May 29, 2020 in European Patent Application No. 16922208.0 11 pages.
Brady et al. "Mulitscale Gigapixel Photography," Nature 486, 386-389, Jun. 21, 2012, doi:10.1038/nature11150.
Curless et al. "Charged-Coupled Devices," University Lecture in Course CSE 558 3D Photography, 2001, http://courses.cs.washington.edu/courses/cse558/01sp/lectures/ccd/pdf [retrieved Nov. 13, 2019], 8 pages.
Eade Ethan," Lie Groups for 2D and 3D Transformations," 2013, updated May 20, 2017, www.ethaneade.com [retrieved Nov. 13, 2019] 25 pages.
Geng, Jason, "Structured-light 3D surface imaging: a tutorial," Advances in Optics and Photonics 3:125-160, Jun. 2011.
Gortler et al. "The Lumigraph," Proceedings of the 23rd Annual Conference on Computer Graphics and Interactive Techniques (ACM 1996), pp. 43-54.
Herakleous et al. "3DUnderworld—SLC: An-Open Source Structured-Light Scanning System for Rapid Geometry Acquisition," arXiv prepring arXiv: 1406.6595v1 (2014), Jun. 26, 2014, 28 pages.
Kang et al. "Stereoscopic augmented reality for laparoscopic surgery," Surgical Endoscopy, 2014 28(7):2227-2235, 2014.
Levoy et al. "Light Field Rendering," Proceedings of the 23rd Annual Conference on Computer Graphics and Interactive Techniques (ACM 1996), pp. 31-42.
Levoy et al. "Light Filed Microscopy," ACM Transactions on Graphic 25(3), Proceedings of Siggraph 2006.
Luke et al. "Near Real-Time Estimation of Super-Resolved Depth and All-in-Focus Images from a Plenoptic Camera Using Graphics Processing Units," International Journal of Digital Multimedia Broadcasting, 2010, 1-12, Jan. 2010.
Mezzana et al. "Augmented Reality in Ocuplastic Surgery: First iPhone Application," Plastic and Reconstructive Surgery, Mar. 2011, pp. 57e-58e.
Ng et al. "Light Field Photography with a Hand-held Plenoptic Camera," Stanford Tech Report CTSR 2005.
"OpenVC 4.1.1," Open Source Computer Vision, Jul. 26, 2019, http://opencv.org/ [retrieved Nov. 13, 2019] 2 pages.
"Point Closest to as Set Four of Lines in 3D," Postin in Mathematics Stack Exchange, May 2, 2011, https://math.stackexchange.com/questions/36398/point-closest-t-a-set-four-of-lines-in-3d/55286#55286 [retrieved Augsut 15, 2019], 3 pages.
"Road to VR," <http://www.roadlovr.com/wp-content/uploads/2016/01/htc-vive-pre-system.jpg. [retrieved Nov. 13, 2019].
Suenaga et al. "Real-time in situ three-dimensional integral videography and surgical navigation using augmented reality: a pilot study," International Journal of Oral Science, 2013, 5:98-102.
Tremblay et al. "Ultrathin cameras using annular folded optics," Applied Optics, Feb. 1, 2007, 46(4):463-471.
User1551, "Point closest to a set four of lines in 3D," posting in Mathematics Stack Exchange, Apr. 25, 2016, <http:math.stackexchange.com/users/1551/user1551> [retrieved Aug. 15, 2019] 3 pages.
Ren, Hongliang, "Marker-Based Surgical Instrument Tracking Using Dual Kinect Sensors", Jul. 2014, IEEE Transactions on Automation Science and Engineering, vol. 11, pp. 921-924 (Year: 2014).
Straube, Guido, "Modelling and calibration of multi-camera-systems for 3D industrial supervision applications", Sep. 2019, "Photonics and Education in Measurement Science", vol. 11144, pp. 1-9 (Year: 2019).

* cited by examiner

METHODS FOR GENERATING STEREOSCOPIC VIEWS IN MULTICAMERA SYSTEMS, AND ASSOCIATED DEVICES AND SYSTEMS

TECHNICAL FIELD

The present technology generally relates to methods for selecting pairs of cameras in a multicamera array configured to image a scene, such as a surgical scene, to generate stereoscopic views, and associated systems and devices.

BACKGROUND

In a mediated reality system, an image processing system adds, subtracts, and/or modifies visual information representing an environment. The visual information can be captured using an array of multiple cameras. For surgical applications, a mediated reality system can enable a surgeon to view a surgical site from a desired perspective together with contextual information that assists the surgeon in more efficiently and precisely performing surgical tasks. In some implementations, to reconstruct an image of the environment, mediated reality systems can utilize (i) image data from multiple ones of the cameras positioned at different angles and orientations relative to the environment and (ii) depth information about the environment. However, such reconstructed images can be complex to compute and/or can be of relatively poor image quality if the reconstruction is based on sparse image data from relatively few cameras.

BRIEF DESCRIPTION OF THE DRAWINGS

Many aspects of the present disclosure can be better understood with reference to the following drawings. The components in the drawings are not necessarily to scale. Instead, emphasis is placed on clearly illustrating the principles of the present disclosure.

DETAILED DESCRIPTION

Figure 1:
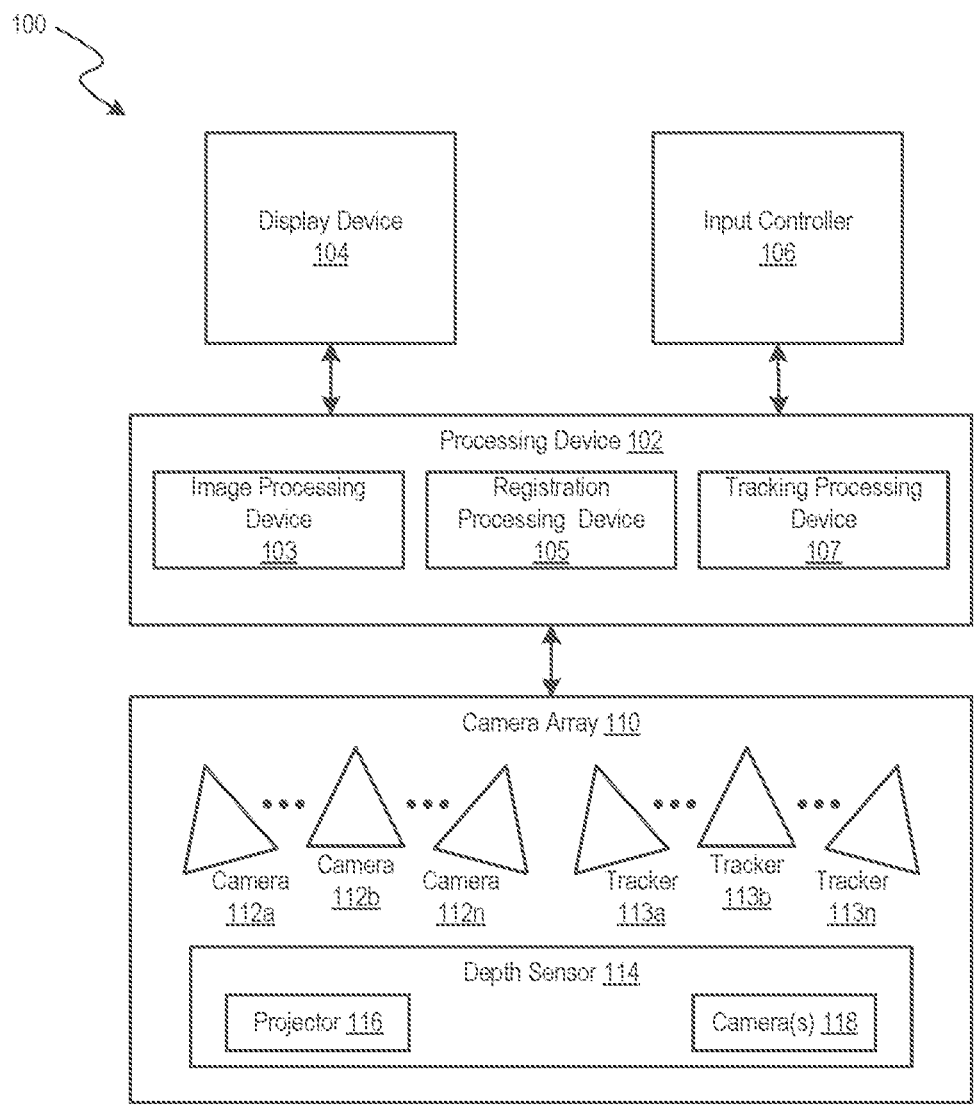
FIG. 1 is a schematic view of an imaging system in accordance with embodiments of the present technology.
Figure 1:
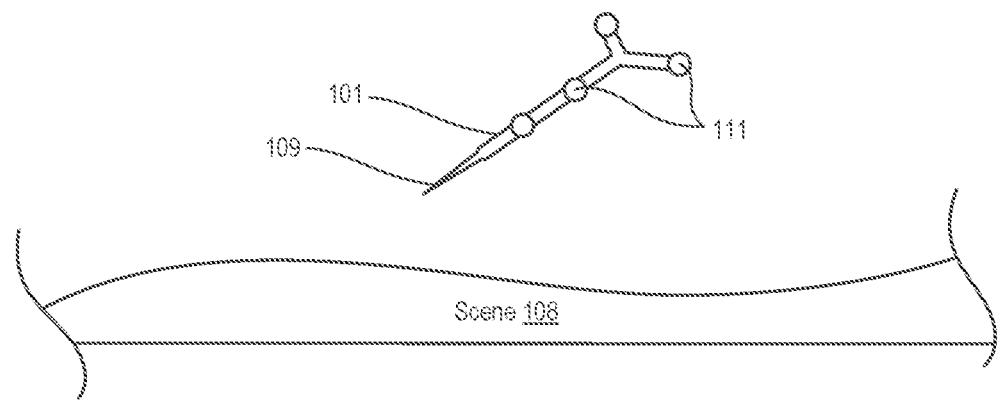

Aspects of the present technology are directed generally to methods for generating stereoscopic views of a scene, such as a surgical scene, based on images from a multicamera array, and associated systems and devices. In several of the embodiments described below, for example, a representative method includes selecting a pair of cameras from the multicamera array from which to generate a stereoscopic view. In some embodiments, the selection is dynamically based on the tracked position of a display device (e.g., a head-mounted display device) and/or an instrument within the scene. The method can further include receiving images of the scene from the selected pair of cameras, and cropping the images based on a known calibration of the cameras and a desired disparity. The desired disparity can correspond to an interpupillary distance of a user (e.g., a surgeon wearing the head-mounted display device). The method can further include displaying the cropped images on the display device to generate the stereoscopic view.

In some embodiments, the stereoscopic view can be a magnified view of the scene. In such embodiments, the method can further include determining a region of interest in the cropped images, and further cropping each of the cropped images to the region of interest. In some embodiments, the regions of interest are dynamically selected based on the tracked position of the display device and/or an instrument within the scene. Then, the regions of interest can be displayed on the display device to generate the magnified stereoscopic view.

In some embodiments, a generated stereoscopic view can be combined/merged with a three-dimensional (3D) reconstructed view of the scene. The 3D reconstructed view can be a computational reconstruction of image data (e.g., light field image data) captured by multiple ones of the cameras in the array. The combined 3D reconstructed view and stereoscopic view of the scene can be displayed on the display device.

Specific details of several embodiments of the present technology are described herein with reference to FIGS. 1-9. The present technology, however, can be practiced without some of these specific details. In some instances, well-known structures and techniques often associated with camera arrays, light field cameras, image reconstruction, registration processes, user interfaces, optical tracking, camera calibration, stereoscopic imaging, and the like have not been shown in detail so as not to obscure the present technology. Moreover, although frequently described in the context of tracking surgical instruments relative to a surgical scene (e.g., a spinal surgical scene), the methods and systems of the present technology can be used to track other types of objects relative to other scenes.

The terminology used in the description presented below is intended to be interpreted in its broadest reasonable manner, even though it is being used in conjunction with a detailed description of certain specific embodiments of the disclosure. Certain terms can even be emphasized below; however, any terminology intended to be interpreted in any restricted manner will be overtly and specifically defined as such in this Detailed Description section.

The accompanying Figures depict embodiments of the present technology and are not intended to be limiting of its scope. Depicted elements are not necessarily drawn to scale, and various elements can be arbitrarily enlarged to improve legibility. Component details can be abstracted in the figures to exclude details as such details are unnecessary for a complete understanding of how to make and use the present technology. Many of the details, dimensions, angles, and other features shown in the Figures are merely illustrative of particular embodiments of the disclosure. Accordingly, other embodiments can have other dimensions, angles, and features without departing from the spirit or scope of the present technology.

The headings provided herein are for convenience only and should not be construed as limiting the subject matter disclosed.

To the extent any materials incorporated herein by reference conflict with the present disclosure, the present disclosure controls.

I. SELECTED EMBODIMENTS OF IMAGING SYSTEMS

FIG. 1 is a schematic view of an imaging system 100 ("system 100") in accordance with embodiments of the present technology. In some embodiments, the system 100 can be a synthetic augmented reality system, a virtual-reality imaging system, an augmented-reality imaging system, a mediated-reality imaging system, and/or a non-immersive computational imaging system. In the illustrated embodiment, the system 100 includes a processing device 102 that is communicatively coupled to one or more display devices 104, one or more input controllers 106, and a camera array 110. In other embodiments, the system 100 can comprise additional, fewer, or different components. In some embodiments, the system 100 includes some features that are generally similar or identical to those of the mediated-reality imaging systems disclosed in (i) U.S. patent application Ser. No. 16/586,375, titled "CAMERA ARRAY FOR A MEDIATED-REALITY SYSTEM," and filed Sep. 27, 2019 and/or (ii) U.S. patent application Ser. No. 15/930,305, titled "METHODS AND SYSTEMS FOR IMAGING A SCENE, SUCH AS A MEDICAL SCENE, AND TRACKING OBJECTS WITHIN THE SCENE," and filed May 12, 2020, each of which is incorporated herein by reference in its entirety.

In the illustrated embodiment, the camera array 110 includes a plurality of cameras 112 (identified individually as cameras 112a-112n; which can also be referred to as first cameras) that can each capture images of a scene 108 (e.g., first image data) from a different perspective. The scene 108 can include for example, a patient undergoing surgery (e.g., spinal surgery) and/or another medical procedure. In other embodiments, the scene 108 can be another type of scene. The camera array 110 can further include dedicated object tracking hardware 113 (e.g., including individually identified trackers 113a-113n) that captures positional data of one more objects, such as an instrument 101 (e.g., a surgical instrument or tool) having a tip 109, to track the movement and/or orientation of the objects through/in the scene 108. In some embodiments, the cameras 112 and the trackers 113 are positioned at fixed locations and orientations (e.g., poses) relative to one another. For example, the cameras 112 and the trackers 113 can be structurally secured by/to a mounting structure (e.g., a frame) at predefined fixed locations and orientations. In some embodiments, the cameras 112 are positioned such that neighboring cameras 112 share overlapping views of the scene 108. In general, the position of the cameras 112 can be selected to maximize clear and accurate capture of all or a selected portion of the scene 108. Likewise, the trackers 113 can be positioned such that neighboring trackers 113 share overlapping views of the scene 108. Therefore, all or a subset of the cameras 112 and the trackers 113 can have different extrinsic parameters, such as position and orientation.

In some embodiments, the cameras 112 in the camera array 110 are synchronized to capture images of the scene 108 simultaneously (within a threshold temporal error). In some embodiments, all or a subset of the cameras 112 are light field/plenoptic/RGB cameras that capture information about the light field emanating from the scene 108 (e.g., information about the intensity of light rays in the scene 108 and also information about a direction the light rays are traveling through space). Therefore, in some embodiments the images captured by the cameras 112 encode depth information representing a surface geometry of the scene 108. In some embodiments, the cameras 112 are substantially identical. In other embodiments, the cameras 112 include multiple cameras of different types. For example, different subsets of the cameras 112 can have different intrinsic parameters such as focal length, sensor type, optical components, and the like. The cameras 112 can have charge-coupled device (CCD) and/or complementary metal-oxide semiconductor (CMOS) image sensors and associated optics. Such optics can include a variety of configurations including lensed or bare individual image sensors in combination with larger macro lenses, micro-lens arrays, prisms, and/or negative lenses. For example, the cameras 112 can be separate light field cameras each having their own image sensors and optics. In other embodiments, some or all of the cameras 112 can comprise separate microlenslets (e.g., lenslets, lenses, microlenses) of a microlens array (MLA) that share a common image sensor.

In some embodiments, the trackers 113 are imaging devices, such as infrared (IR) cameras that can capture images of the scene 108 from a different perspective compared to other ones of the trackers 113. Accordingly, the trackers 113 and the cameras 112 can have different spectral sensitives (e.g., infrared vs. visible wavelength). In some embodiments, the trackers 113 capture image data of a plurality of optical markers (e.g., fiducial markers, marker balls) in the scene 108, such as markers 111 coupled to the instrument 101.

In the illustrated embodiment, the camera array 110 further includes a depth sensor 114. In some embodiments, the depth sensor 114 includes (i) one or more projectors 116 that project a structured light pattern onto/into the scene 108 and (ii) one or more depth cameras 118 (which can also be referred to as second cameras) that capture second image data of the scene 108 including the structured light projected onto the scene 108 by the projector 116. The projector 116 and the depth cameras 118 can operate in the same wavelength and, in some embodiments, can operate in a wavelength different than the cameras 112. For example, the cameras 112 can capture the first image data in the visible spectrum, while the depth cameras 118 capture the second image data in the infrared spectrum. In some embodiments, the depth cameras 118 have a resolution that is less than a resolution of the cameras 112. For example, the depth cameras 118 can have a resolution that is less than 70%, 60%, 50%, 40%, 30%, or 20% of the resolution of the cameras 112. In other embodiments, the depth sensor 114 can include other types of dedicated depth detection hardware (e.g., a LiDAR detector) for determining the surface geometry of the scene 108. In other embodiments, the camera array 110 can omit the projector 116 and/or the depth cameras 118.

In the illustrated embodiment, the processing device 102 includes an image processing device 103 (e.g., an image processor, an image processing module, an image processing unit), a registration processing device 105 (e.g., a registration processor, a registration processing module, a registration processing unit), and a tracking processing device 107 (e.g., a tracking processor, a tracking processing module, a tracking processing unit). The image processing device 103 can (i) receive the first image data captured by the cameras 112 (e.g., light field images, light field image data, RGB images) and depth information from the depth sensor 114 (e.g., the second image data captured by the depth cameras 118), and (ii) process the image data and depth information to synthesize (e.g., generate, reconstruct, render) a three-dimensional (3D) output image of the scene 108 corresponding to a virtual camera perspective. The output image can correspond to an approximation of an image of the scene 108 that would be captured by a camera placed at an arbitrary position and orientation corresponding to the virtual camera perspective. In some embodiments, the image processing device 103 can further receive and/or store calibration data for the cameras 112 and/or the depth cameras 118 and synthesize the output image based on the image data, the depth information, and/or the calibration data. More specifically, the depth information and the calibration data can be used/combined with the images from the cameras 112 to synthesize the output image as a 3D (or stereoscopic 2D) rendering of the scene 108 as viewed from the virtual camera perspective. In some embodiments, the image processing device 103 can synthesize the output image using any of the methods disclosed in U.S. patent application Ser. No. 16/457,780, titled "SYNTHESIZING AN IMAGE FROM A VIRTUAL PERSPECTIVE USING PIXELS FROM A PHYSICAL IMAGER ARRAY WEIGHTED BASED ON DEPTH ERROR SENSITIVITY," and filed Jun. 28, 2019, which is incorporated herein by reference in its entirety. In other embodiments, the image processing device 103 can generate the virtual camera perspective based only on the images captured by the cameras 112—without utilizing depth information from the depth sensor 114. For example, the image processing device 103 can generate the virtual camera perspective by interpolating between the different images captured by one or more of the cameras 112.

The image processing device 103 can synthesize the output image from images captured by a subset (e.g., two or more) of the cameras 112 in the camera array 110, and does not necessarily utilize images from all of the cameras 112. For example, for a given virtual camera perspective, the processing device 102 can select a stereoscopic pair of images from two of the cameras 112, as described in greater detail below with reference to FIGS. 4-9. In some embodiments, such a stereoscopic pair can be selected to be positioned and oriented to most closely match the virtual camera perspective. In some embodiments, the image processing device 103 (and/or the depth sensor 114) estimates a depth for each surface point of the scene 108 relative to a common origin to generate a point cloud and/or a 3D mesh that represents the surface geometry of the scene 108. For example, in some embodiments the depth cameras 118 of the depth sensor 114 detect the structured light projected onto the scene 108 by the projector 116 to estimate depth information of the scene 108. In some embodiments, the image processing device 103 estimates depth from multiview image data from the cameras 112 using techniques such as light field correspondence, stereo block matching, photometric symmetry, correspondence, defocus, block matching, texture-assisted block matching, structured light, and the like, with or without utilizing information collected by the depth sensor 114. In other embodiments, depth may be acquired by a specialized set of the cameras 112 performing the aforementioned methods in another wavelength.

In some embodiments, the registration processing device 105 receives and/or stores previously-captured image data, such as image data of a three-dimensional volume of a patient (3D image data). The image data can include, for example, computerized tomography (CT) scan data, magnetic resonance imaging (MRI) scan data, ultrasound images, fluoroscope images, and/or other medical or other image data. The registration processing device 105 can register the preoperative image data to the real-time images captured by the cameras 112 and/or the depth sensor 114 by, for example, determining one or more transforms/transformations/mappings between the two. The processing device 102 (e.g., the image processing device 103) can then apply the one or more transforms to the preoperative image data such that the preoperative image data can be aligned with (e.g., overlaid on) the output image of the scene 108 in real-time or near real time on a frame-by-frame basis, even as the virtual perspective changes. That is, the image processing device 103 can fuse the preoperative image data with the real-time output image of the scene 108 to present a mediated-reality view that enables, for example, a surgeon to simultaneously view a surgical site in the scene 108 and the underlying 3D anatomy of a patient undergoing an operation. In some embodiments, the registration processing device 105 can register the previously-captured image data to the real-time images by using any of the methods disclosed in U.S. patent application Ser. No. 17/140,885, titled "METHODS AND SYSTEMS FOR REGISTERING PREOPERATIVE IMAGE DATA TO INTRAOPERATIVE IMAGE DATA OF A SCENE, SUCH AS A SURGICAL SCENE," and filed Jan. 4, 2021, which is incorporated herein by reference in its entirety.

In some embodiments, the tracking processing device 107 processes positional data captured by the trackers 113 to track objects (e.g., the instrument 101) within the vicinity of the scene 108. For example, the tracking processing device 107 can determine the position of the markers 111 in the 2D images captured by two or more of the trackers 113, and can compute the 3D position of the markers 111 via triangulation of the 2D positional data. More specifically, in some embodiments the trackers 113 include dedicated processing hardware for determining positional data from captured images, such as a centroid of the markers 111 in the captured images. The trackers 113 can then transmit the positional data to the tracking processing device 107 for determining the 3D position of the markers 111. In other embodiments, the tracking processing device 107 can receive the raw image data from the trackers 113. In a surgical application, for example, the tracked object can comprise a surgical instrument, an implant, a hand or arm of a physician or assistant, and/or another object having the markers 111 mounted thereto. In some embodiments, the processing device 102 can recognize the tracked object as being separate from the scene 108, and can apply a visual effect to the 3D output image to distinguish the tracked object by, for example, highlighting the object, labeling the object, and/or applying a transparency to the object.

In some embodiments, functions attributed to the processing device 102, the image processing device 103, the registration processing device 105, and/or the tracking processing device 107 can be practically implemented by two or more physical devices. For example, in some embodiments a synchronization controller (not shown) controls images displayed by the projector 116 and sends synchronization signals to the cameras 112 to ensure synchronization between the cameras 112 and the projector 116 to enable fast, multi-frame, multicamera structured light scans. Additionally, such a synchronization controller can operate as a parameter server that stores hardware specific configurations such as parameters of the structured light scan, camera settings, and camera calibration data specific to the camera configuration of the camera array 110. The synchronization controller can be implemented in a separate physical device from a display controller that controls the display device 104, or the devices can be integrated together.

The processing device 102 can comprise a processor and a non-transitory computer-readable storage medium that stores instructions that when executed by the processor, carry out the functions attributed to the processing device 102 as described herein. Although not required, aspects and embodiments of the present technology can be described in the general context of computer-executable instructions, such as routines executed by a general-purpose computer, e.g., a server or personal computer. Those skilled in the relevant art will appreciate that the present technology can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The present technology can be embodied in a special purpose computer or data processor that is specifically programmed, configured or constructed to perform one or more of the computer-executable instructions explained in detail below. Indeed, the term "computer" (and like terms), as used generally herein, refers to any of the above devices, as well as any data processor or any device capable of communicating with a network, including consumer electronic goods such as game devices, cameras, or other electronic devices having a processor and other components, e.g., network communication circuitry.

The present technology can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or sub-routines can be located in both local and remote memory storage devices. Aspects of the present technology described below can be stored or distributed on computer-readable media, including magnetic and optically readable and removable computer discs, stored as in chips (e.g., EEPROM or flash memory chips). Alternatively, aspects of the present technology can be distributed electronically over the Internet or over other networks (including wireless networks). Those skilled in the relevant art will recognize that portions of the present technology can reside on a server computer, while corresponding portions reside on a client computer. Data structures and transmission of data particular to aspects of the present technology are also encompassed within the scope of the present technology.

The virtual camera perspective is controlled by an input controller 106 that can update the virtual camera perspective based on user driven changes to the camera's position and rotation. The output images corresponding to the virtual camera perspective can be outputted to the display device 104. In some embodiments, the image processing device 103 can vary the perspective, the depth of field (e.g., aperture), the focus plane, and/or another parameter of the virtual camera (e.g., based on an input from the input controller) to generate different 3D output images without physically moving the camera array 110. The display device 104 can receive output images (e.g., the synthesized 3D rendering of the scene 108) and display the output images for viewing by one or more viewers. In some embodiments, the processing device 102 receives and processes inputs from the input controller 106 and processes the captured images from the camera array 110 to generate output images corresponding to the virtual perspective in substantially real-time or near real-time as perceived by a viewer of the display device 104 (e.g., at least as fast as the frame rate of the camera array 110).

Additionally, the display device 104 can display a graphical representation on/in the image of the virtual perspective of any (i) tracked objects within the scene 108 (e.g., a surgical instrument) and/or (ii) registered or unregistered preoperative image data. That is, for example, the system 100 (e.g., via the display device 104) can blend augmented data into the scene 108 by overlaying and aligning information on top of "passthrough" images of the scene 108 captured by the cameras 112. Moreover, the system 100 can create a mediated reality experience where the scene 108 is reconstructed using light field image date of the scene 108 captured by the cameras 112, and where instruments are virtually represented in the reconstructed scene via information from the trackers 113. Additionally or alternatively, the system 100 can remove the original scene 108 and completely replace it with a registered and representative arrangement of the preoperatively captured image data, thereby removing information in the scene 108 that is not pertinent to a user's task.

The display device 104 can comprise, for example, a head-mounted display device, a monitor, a computer display, and/or another display device. In some embodiments, the input controller 106 and the display device 104 are integrated into a head-mounted display device and the input controller 106 comprises a motion sensor that detects position and orientation of the head-mounted display device. In some embodiments, the system 100 can further include a separate tracking system (not shown), such an optical tracking system, for tracking the display device 104, the instrument 101, and/or other components within the scene 108. Such a tracking system can detect a position of the head-mounted display device 104 and input the position to the input controller 106. The virtual camera perspective can then be derived to correspond to the position and orientation of the head-mounted display device 104 in the same reference frame and at the calculated depth (e.g., as calculated by the depth sensor 114) such that the virtual perspective corresponds to a perspective that would be seen by a viewer wearing the head-mounted display device 104. Thus, in such embodiments the head-mounted display device 104 can provide a real-time rendering of the scene 108 as it would be seen by an observer without the head-mounted display device 104. Alternatively, the input controller 106 can comprise a user-controlled control device (e.g., a mouse, pointing device, handheld controller, gesture recognition controller) that enables a viewer to manually control the virtual perspective displayed by the display device 104.

Figure 2:
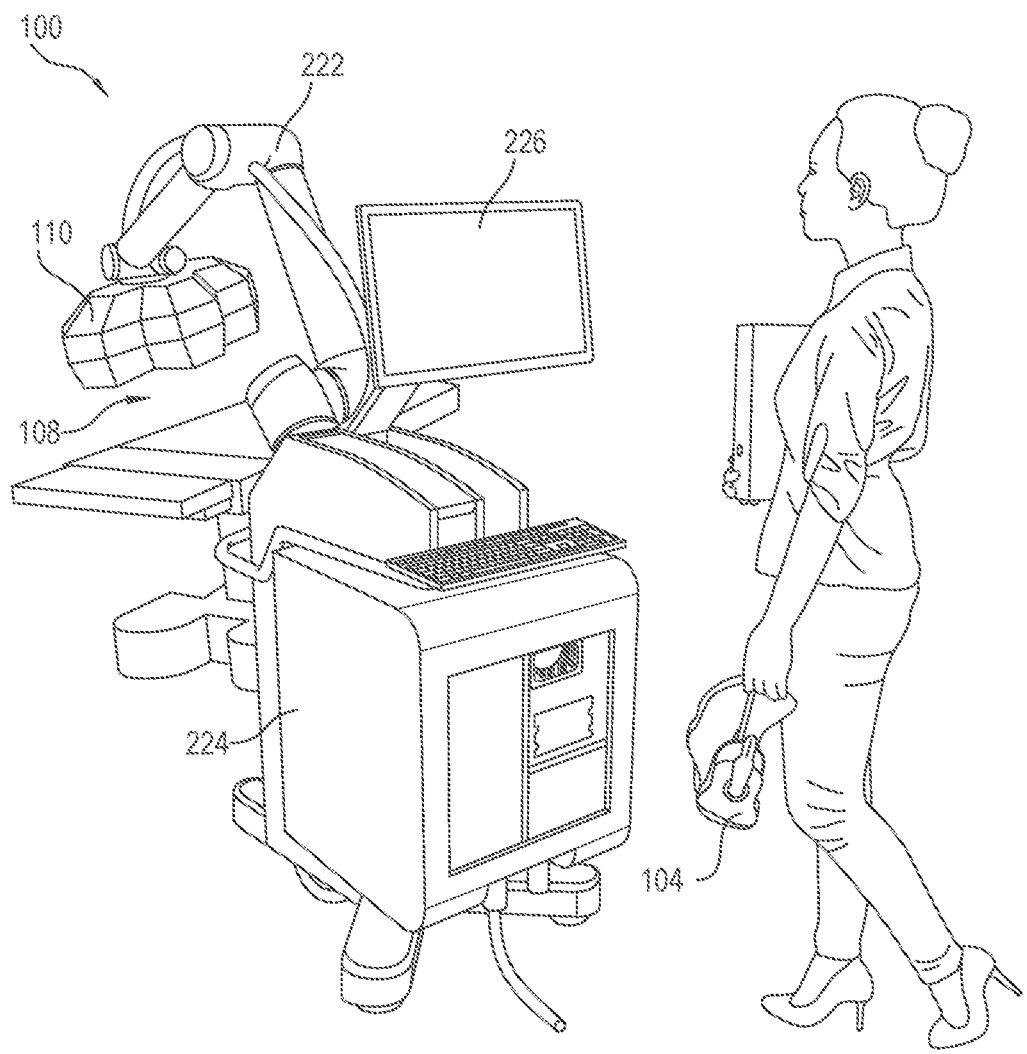
FIG. 2 is a perspective view of a surgical environment employing the imaging system of FIG. 1 for a surgical application in accordance with embodiments of the present technology.

FIG. 2 is a perspective view of a surgical environment employing the system 100 for a surgical application in accordance with embodiments of the present technology. In the illustrated embodiment, the camera array 110 is positioned over the scene 108 (e.g., a surgical site) and supported/positioned via a movable arm 222 that is operably coupled to a workstation 224. In some embodiments, the arm 222 is manually movable to position the camera array 110 while, in other embodiments, the arm 222 is robotically controlled in response to the input controller 106 (FIG. 1) and/or another controller. In the illustrated embodiment, the display device 104 is a head-mounted display device (e.g., a virtual reality headset, augmented reality headset). The workstation 224 can include a computer to control various functions of the processing device 102, the display device 104, the input controller 106, the camera array 110, and/or other components of the system 100 shown in FIG. 1. Accordingly, in some embodiments the processing device 102 and the input controller 106 are each integrated in the workstation 224. In some embodiments, the workstation 224 includes a secondary display 226 that can display a user interface for performing various configuration functions, a mirrored image of the display on the display device 104, and/or other useful visual images/indications. In other embodiments, the system 100 can include more or fewer display devices. For example, in addition to the display device 104 and the secondary display 226, the system 100 can include another display (e.g., a medical grade computer monitor) visible to the user wearing the display device 104.

Figure 3:
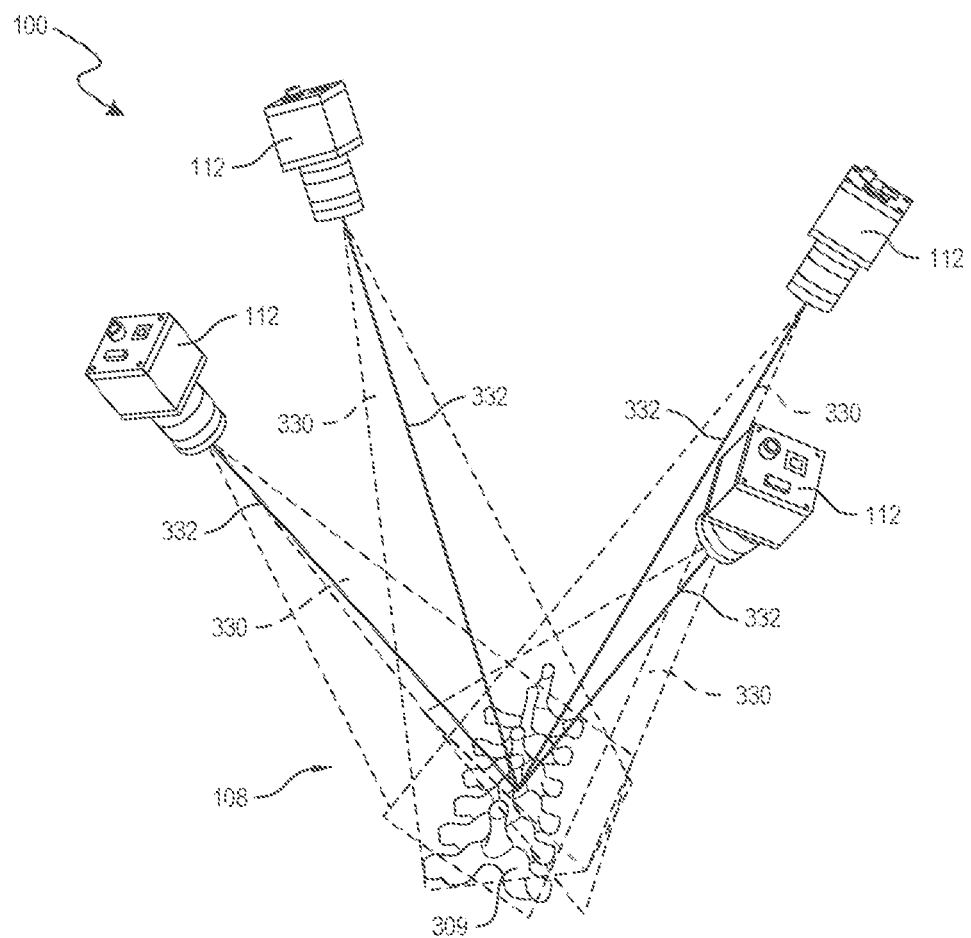
FIG. 3 is an isometric view of a portion of the imaging system of FIG. 1 illustrating four cameras of the imaging system in accordance with embodiments of the present technology.

FIG. 3 is an isometric view of a portion of the system 100 illustrating four of the cameras 112 in accordance with embodiments of the present technology. Other components of the system 100 (e.g., other portions of the camera array 110, the processing device 102, etc.) are not shown in FIG. 3 for the sake of clarity. In the illustrated embodiment, each of the cameras 112 has a field of view 330 and a focal axis 332. The cameras 112 can be oriented such that the fields of view 330 are aligned with a portion of the scene 108 and at least partially overlap one another to together define an imaging volume. For example, in the illustrated embodiment the fields of view 330 of the cameras 112 converge toward a common measurement volume including a portion of a spine 309 of a patient (e.g., a human patient) located in/at the scene 108. In some embodiments, the cameras 112 are further oriented such that the focal axes 332 converge to a common point in the scene 108. In some aspects of the present technology, the convergence/alignment of the focal axes 332 can generally maximize disparity measurements between the cameras 112. In some embodiments, the cameras 112 are fixedly positioned relative to one another (e.g., rigidly mounted to a common frame) such that a relative positioning of the cameras 112 relative to one another is known and/or can be readily determined via a calibration process. In other embodiments, the system 100 can include a different number of the cameras 112 and/or the cameras 112 can be positioned differently relative to another.

II. SELECTED EMBODIMENTS OF GENERATING STEREOSCOPIC VIEWS FROM A MULTICAMERA ARRAY

Referring to FIGS. 1-3, in some embodiments the system 100 can generate stereoscopic views of the scene 108 from images captured by one or more pairs of the cameras 112 in the camera array 110. For example, the system 100 can (i) receive an image from a first one of the cameras 112, (ii) receive an image from a second ones of the cameras 112, and (iii) display the images on the display device 104 to generate a stereoscopic view of the scene 108. In some aspects of the present technology, such stereoscopic views can be computationally easier to generate and/or of higher image quality than views generated via computational (e.g., image synthesis) processes, as described in detail above.

Figure 4:
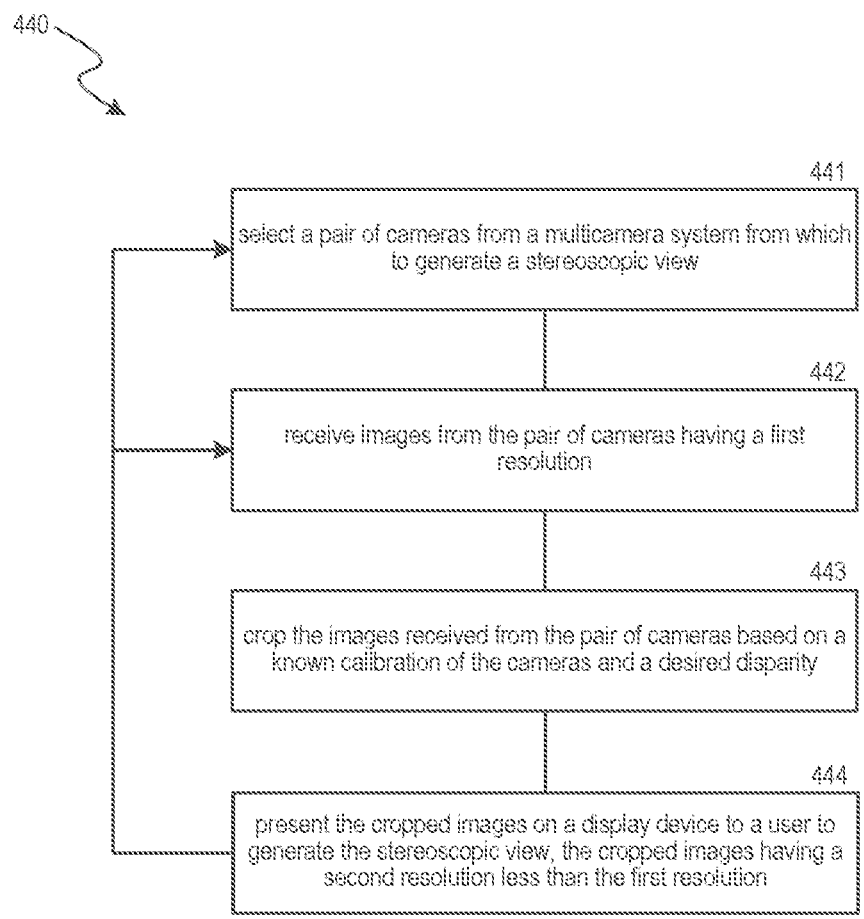
FIG. 4 is a flow diagram of a process or method for generating stereoscopic views using the imaging system of FIG. 1 in accordance with embodiments of the present technology.

More specifically, FIG. 4 is a flow diagram of a process or method 440 for generating stereoscopic views from a multicamera system (e.g., the camera array 110 including the cameras 112) in accordance with embodiments of the present technology. Although some features of the method 440 are described in the context of the embodiments shown in FIGS. 1-3 for illustration, one skilled in the art will readily understand that the method 440 can be carried out using other suitable systems and/or devices described herein.

At block 441, the method 440 can include selecting a pair of the cameras 112 (e.g., a stereoscopic pair) in the camera array 110 from which to generate a stereoscopic view. In some embodiments, the selection of the pair of the cameras 112 is dynamic. For example, the system 100 can track the location of the head-mounted display device 104 (e.g., using the trackers 113 and/or an auxiliary tracking system) and select a pair of the cameras 112 that is nearest to the head-mounted display device 104 or that best correspond to a viewpoint of the head-mounted display device 104. Similarly, the system 100 can track the location of the instrument 101 and select a pair of the cameras 112 that is nearest the instrument 101 or that have a best view of the instrument 101. In other embodiments, the pair of the cameras 112 can be manually selected by a user. For example, a user can select a pair of the cameras 112 that provide the least obstructed view of an object of interest in the scene 108.

At block 442, the method 440 can include receiving images (e.g., "source images") from the selected pair of the cameras 112. The images can have a first resolution that is relatively high, such as a resolution of greater than 5 megapixels, greater than 9 megapixels, greater than 12 megapixels, greater than 15 megapixels, or greater. In some embodiments, the images can be rectangular having a resolution of, for example 3008 pixels×3008 pixels.

Figure 5:
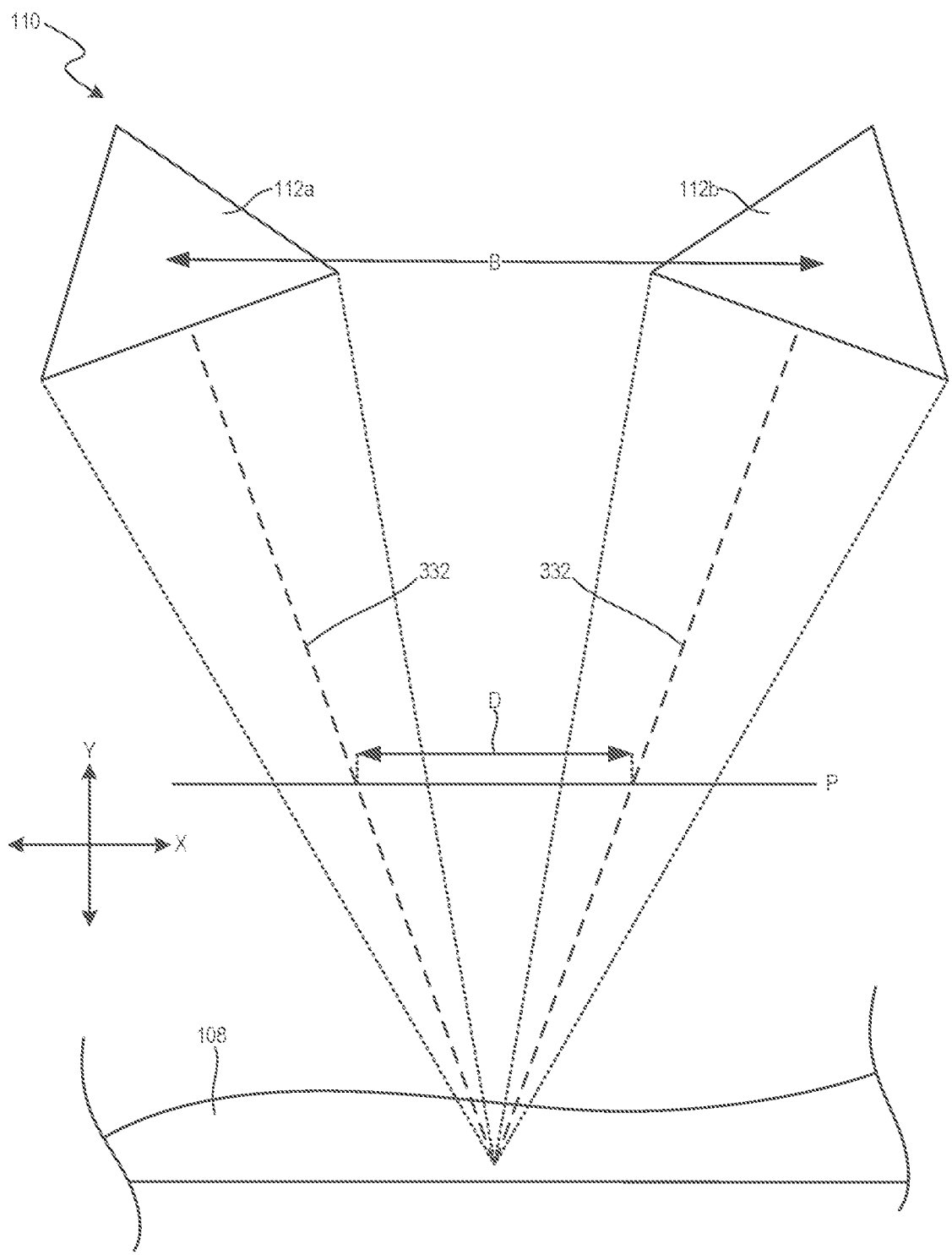
FIG. 5 is a schematic illustration of a portion of the imaging system of FIG. 1 including a selected pair of the cameras in accordance with embodiments of the present technology.

FIG. 5 is a schematic illustration of a portion of the system 100 including a selected pair of the cameras 112 (identified individually as a first camera 112a and a second camera 112b) from the camera array 110 in accordance with embodiments of the present technology. In the illustrated embodiment, the cameras 112a-b are separated by a fixed baseline distance B. The baseline distance B can be determined from a process used to manufacture the camera array 110 and/or, during a calibration process for the camera array 110. The baseline distance B can correspond to a disparity between the source images captured by the cameras 112a-b (block 442). In some embodiments, the disparity is greater than the interpupillary distance (IPD) of a user (e.g., greater than about 62 millimeters, greater than 50 millimeters, two times greater than the IPD or an average IPD). Accordingly, if the source images were presented to a user via the display device 104, the relatively large disparity between the images could cause the user to be unable to perceive the source images as a stereoscopic 3D view of the scene 108.

Accordingly, at block 443 the method can include cropping the source images from the selected pair of the cameras 112 based on a known calibration (e.g., including a geometry and/or other extrinsic parameters) of the cameras 112 and a desired disparity (e.g., a horizontal disparity along an axis X in FIG. 5). In some embodiments, the source images are initially aligned vertically (e.g., along an axis Y in FIG. 5) using the known calibration including the baseline distance B. Alternatively or additionally, the source images can be vertically aligned using an optical flow process which can help account for any errors in the calibration. Then, a horizontal disparity between the source images can be calculated based on the calibration of the pair of the cameras 112 and a viewing plane corresponding to the desired disparity. The desired disparity can correspond to an IPD of a particular user or an average IPD (e.g., about 62 millimeters, between about 54-74 millimeters). In some embodiments, the desired disparity can be greater than or less than the IPD of the user or an average IPD based on a desired viewing characteristic for the subsequently generated stereoscopic view, as described in greater detail below.

More specifically, as shown in FIG. 5, there is some viewing plane P (e.g., a horizontal plane extending along the axis X) at which the focal axes 332 of the cameras 112a-b are separated by the desired disparity (identified as desired disparity D) because the focal axes 332 converge. Accordingly, the source images from the cameras 112a-b can each be cropped based on the calibration of the cameras 112a-b (e.g., the baseline distance B, a distance at which the focal axes 332 converge, and/or other extrinsic parameters) to a cropped region corresponding to the viewing plane P. Therefore, the resulting cropped images of the scene 108 can have the desired disparity.

Figure 6:
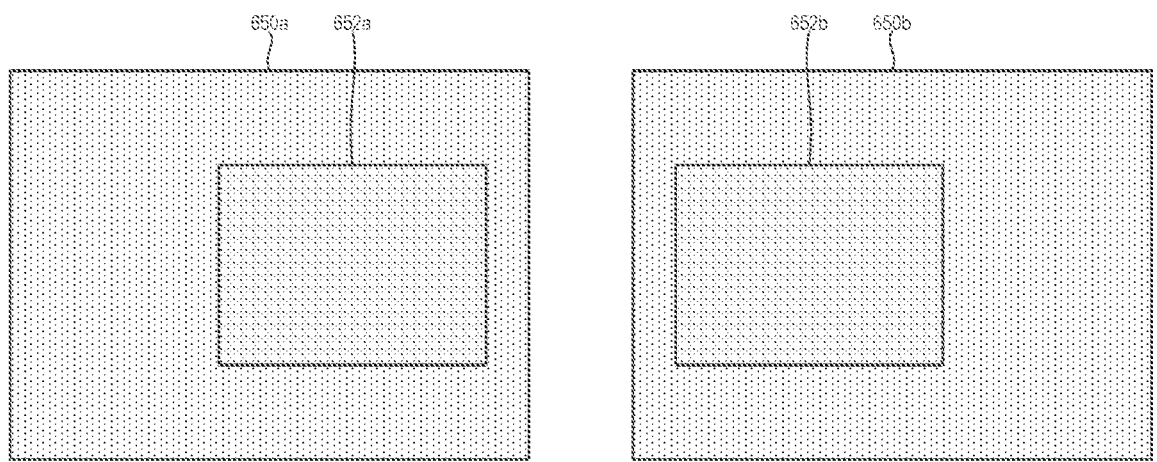
FIG. 6 is a schematic illustration of a first source image received from a first one of the selected pair of the cameras of FIG. 5 and a second source image received from a second one of the selected pair of the cameras of FIG. 5 in accordance with embodiments of the present technology.

FIG. 6, for example, is a schematic illustration of a first source image 650a received from the first camera 112a and a second source image 650b received from the second camera 112b in accordance with embodiments of the present technology. In the illustrated embodiment, the first source image 650a can be cropped to a first cropped region 652a corresponding to the viewing plane P (FIG. 5), and the second source image 650b can likewise be cropped to a second cropped region 652b corresponding to the view plane P. As such, the cropped regions 652a-b can provide a view of the scene 108 at the desired disparity.

At block 444, the method 440 can include presenting the cropped images on a display device to generate a stereoscopic view (e.g., three-dimensional (3D) view) of the scene 108. For example, with reference to FIG. 6, the first cropped region 652a and the second cropped region 652b can be presented on the head-mounted display device 104 and/or another display device to provide the stereoscopic view to the viewer. Because the images are cropped, they have a second resolution less than the first resolution of the cameras 112a-b and the corresponding source images 650a-b. In some embodiments, the display device 104 can have a resolution that matches the resolution of the cropped images, or the cropped images can be scaled (e.g., scaled down) in resolution for display on the display device 104.

In some embodiments, the desired disparity can be selected (block 443) to provide a desired viewing characteristic of the stereoscopic view (e.g., to enhance the sense of "depth" in the scene 108). For example, the desired disparity can correspond to the IPD of the user or an average IPD such that the stereoscopic view provides a realistic 3D view of the scene 108. In some embodiments, the desired disparity can be greater than the IPD of the user or an average IPD such that the source images and the cropped images overlap less and the stereoscopic view provides a view of the scene 108 with a greater depth of field—providing the user with a more accurate sense depth. In other embodiments, the desired disparity can be less than the IPD of the user or an average IPD such that the source images and the cropped images overlap more and the stereoscopic view provides a view of the scene 108 with a smaller depth of field—magnifying the depth perceived by the user (e.g., such that objects at different depths vary as shallow changes).

After block 444, the method can return to block 441 and/or block 442. For example, the method 440 can return to block 441 to select a new pair of the cameras 112, or can return to block 442 to receive another set of images from the previously-selected pair of the cameras 112. In some embodiments, the method 440 can operate in real-time or near real-time to continuously receive images from a selected pair of the cameras 112 (block 442), crop the images based on a desired disparity (443), and present the cropped images on the display device 104 to provide a stereoscopic video view.

Figure 7:
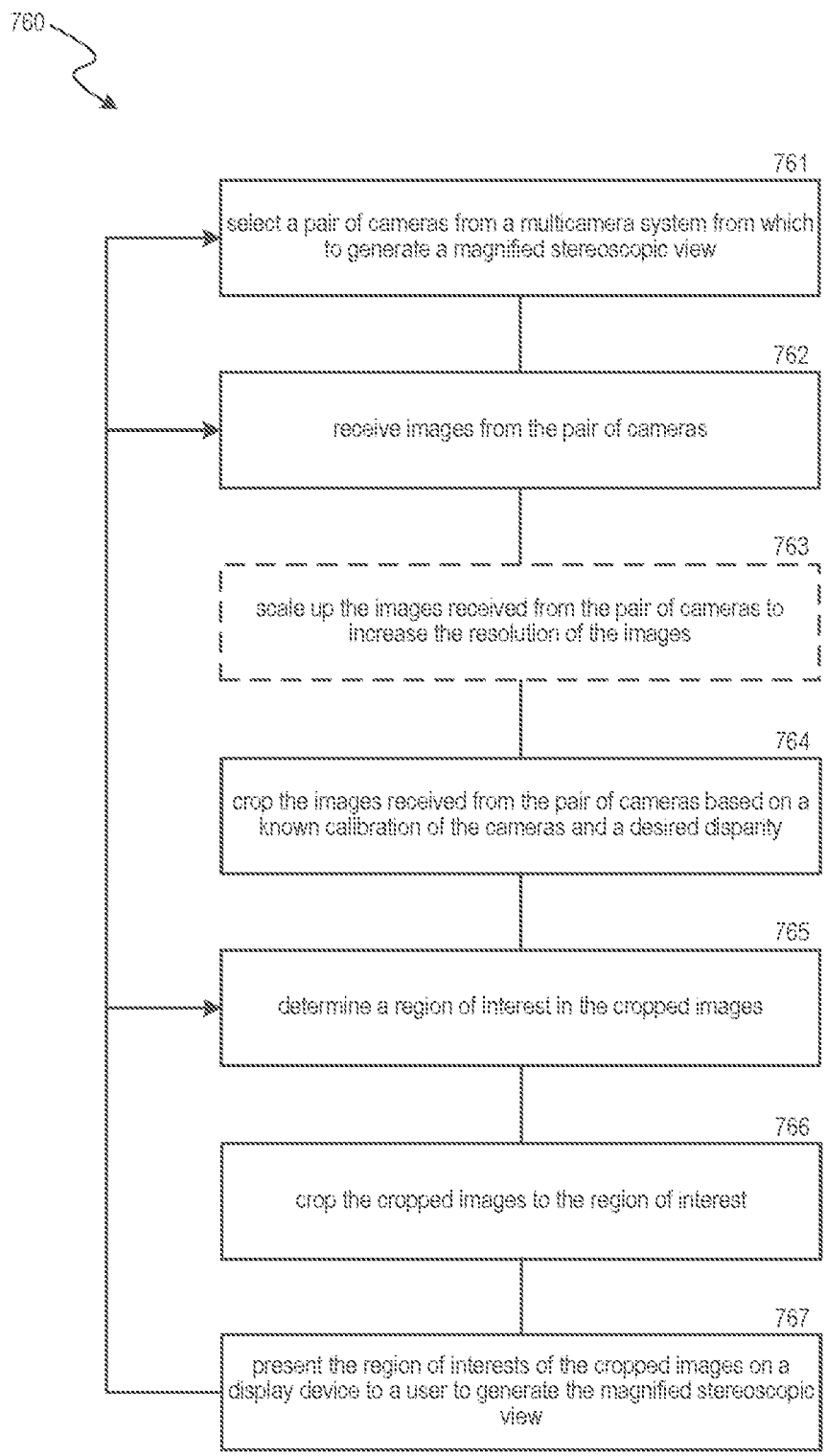
FIG. 7 is a flow diagram of a process or method for generating magnified stereoscopic views using the imaging system of FIG. 1 in accordance with embodiments of the present technology.

In some embodiments, the system 100 can generate magnified stereoscopic views of the scene 108 from images captured by one or more pairs of the cameras 112 in the camera array 110. More specifically, FIG. 7 is a flow diagram of a process or method 760 for generating a magnified stereoscopic view from a multicamera system (e.g., the camera array 110 including the cameras 112) in accordance with embodiments of the present technology. Although some features of the method 760 are described in the context of the embodiments shown in FIGS. 1-3 for illustration, one skilled in the art will readily understand that the method 760 can be carried out using other suitable systems and/or devices described herein.

At block 761, the method 760 can include selecting a pair of the cameras 112 in the camera array 110 (e.g., a stereoscopic pair of the cameras 112) from which to generate a magnified stereoscopic view. At block 762, the method 760 can include receiving images (e.g., "source images") from the selected pair of the cameras 112. In some embodiments, blocks 761 and 762 of the method 760 can be generally similar or identical to blocks 441 and 442 of the method 440 described in detail above with reference to FIG. 4.

At block 763, the method 760 can optionally include scaling up the images received from the pair of the cameras 112 to increase their resolution. The images can be scaled up using an interpolation, super-resolution, and/or other suitable method. In some embodiments, the images are scaled up using a super-resolution method, which can effectively increase resolution while minimizing image artifacts because the images from the cameras 112 at least partially overlap (e.g., due to the overlapping fields of view 330 shown in FIG. 3).

At block 764, the method 760 can include cropping the source images from the selected pair of the cameras 112 based on a known calibration of the cameras 112 and a desired disparity, such as a disparity corresponding to an IPD of the user. In some embodiments, block 764 of the method 760 can be generally similar or identical to block 463 of the method 440 described in detail above with reference to FIGS. 4-6.

Figure 8A:
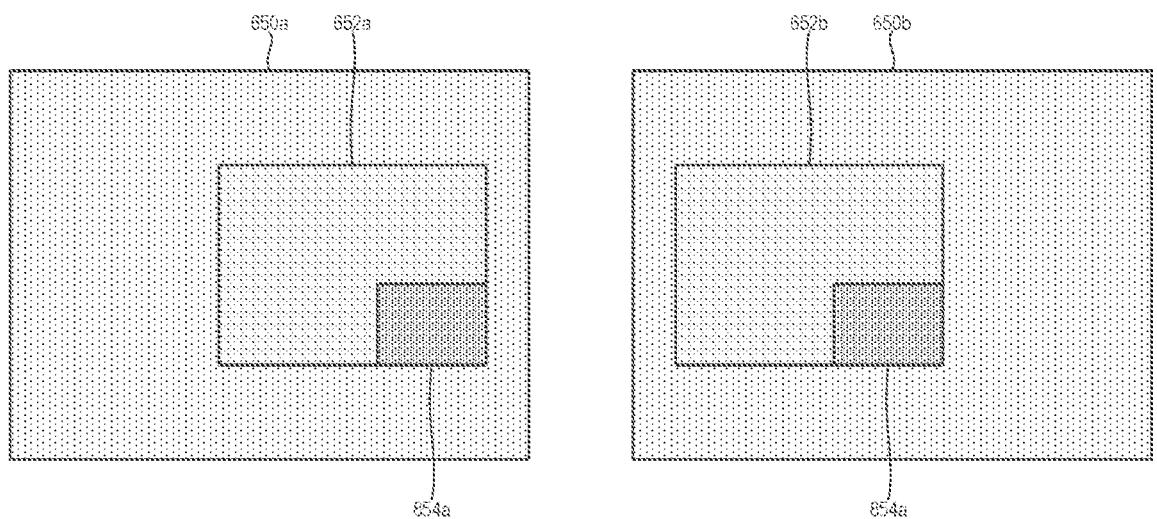
FIGS. 8A and 8B are schematic illustrations of the first source image and the second source image of FIG. 6 in accordance with additional embodiments of the present technology.
Figure 8B:
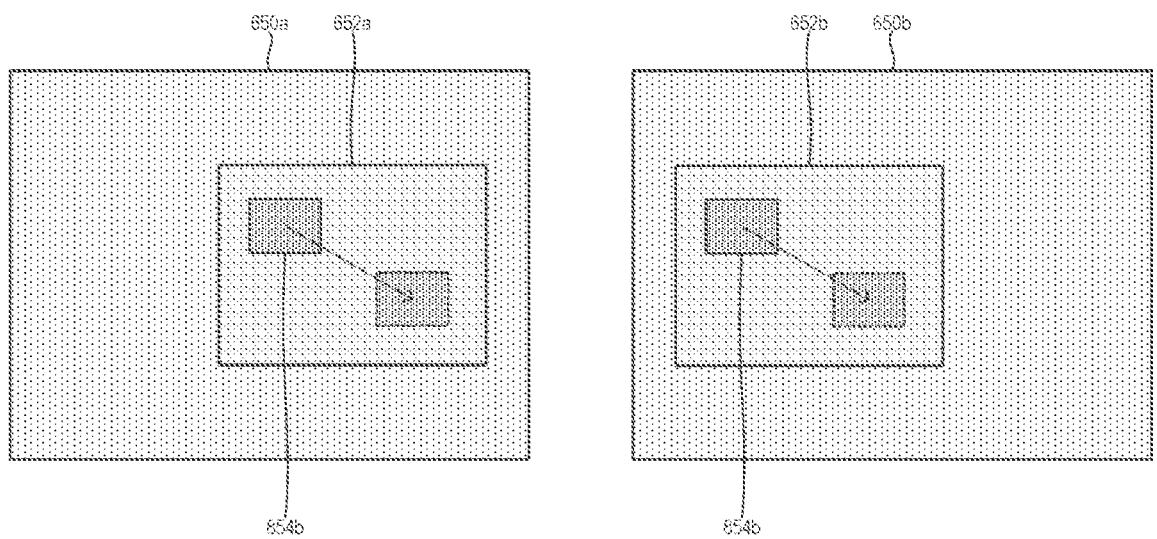

At block 765, the method 760 can include determining a region of interest (e.g., which can also be referred to as a magnification region) in each of the cropped regions of the images. FIGS. 8A and 8B, for example, are schematic illustrations of the first source image 650a including the first cropped region 652a and the second source image 650b including the second cropped region 652b in accordance with embodiments of the present technology. In FIG. 8A, first regions of interest 854a have been selected in the cropped regions 652a-b. In FIG. 8B, different second regions of interest 854b have been selected in the cropped regions 652a-b. Referring to FIGS. 8A and 8B together, the regions of interest 854a-b can have different sizes and/or positions relative to the cropped regions 652a-b. In some embodiments, the regions of interest 854a-b are selected to have the same relative position and size within the cropped regions 652*a-b*. For example, in the embodiment illustrated in FIG. 8A, the first regions of interest 854*a* each have the same size and are positioned in a lower right corner of the cropped regions 652*a-b*. Likewise, in the embodiment illustrated in FIG. 8B, the second regions of interest 854*b* each have the same size (smaller than the first regions of interest 854*b*) and are positioned in an upper left portion of the cropped regions 652*a-b*. In some aspects of the present technology, selecting the regions of interest to have the same relative size and position relative to the cropped regions of the source images can ensure that a disparity between the selected regions of interest is the same as the disparity between the cropped regions. For example, the cropped regions can be selected to have a disparity generally corresponding to an IPD of the user such that the regions of interest also have a disparity corresponding to the IPD.

The size and/or position of the regions of interest can be selected by a user, such as a surgeon or surgical technician, viewing one or more of (i) the cropped regions 652*a-b* and/or (ii) the source images 650*a-b*. For example, the user can manually select the rectangular first regions of interest 854*a* based on an object in the source images 650*a-b* to be viewed with greater magnification. In other embodiments, the regions of interest can be automatically selected as a predetermined portion of the cropped regions 652*a-b*—such as a center, top left, bottom right, etc., of the cropped regions 652*a-b*. In FIG. 8A, for example, the first regions of interest 854*a* correspond to a lower right portion of the cropped regions 652*a-b*. In other embodiments, the regions of interest can be dynamically selected. For example, the system 100 can track the location of the head-mounted display device 104 (e.g., using the trackers 113 and/or an auxiliary tracking system) to determine a gaze direction of the user, and determine the regions of interest to correspond to the gaze direction of the user. Similarly, the system 100 can track the location of the instrument 101 and/or another instrument and determine the regions of interest to best match the location of the instrument 101. In yet other embodiments, the regions of interest are determined by tracking the direction of the user's eyes via, for example, an eye tracker mounted in the head-mounted display device 104.

At block 766, the method 760 can include further cropping the cropped images to the regions of interest. And, at block 767, the method 760 can include presenting the regions of interest on a display device to generate a magnified stereoscopic view (e.g., three-dimensional (3D) view) of the scene 108. For example, with reference to FIGS. 8A and 8B, the first regions of interest 854*a* or the second regions of interest 854*b* can be presented on the head-mounted display device 104 and/or another display device to provide a stereoscopic view to the viewer. Because the images are cropped, they have a second resolution less than the resolution of the cameras 112*a-b* and the corresponding source images 650*a-b*. In some embodiments, the display device 104 can have a resolution that matches the resolution of the regions of interest, or the cropped images can be scaled (e.g., scaled down) in resolution for display on the display device 104. By presenting the regions of interest to the user at a resolution sufficient to match the resolution of the display device 104, the regions of interest provide a digitally magnified view of the scene 108. In some embodiments, scaling up the resolution of the source images (block 763) can allow for greater magnification by providing a greater difference in resolution between the source images and the display device 104 (and the images to be presented thereon). Additionally, as described in detail above, the disparity between the regions of interest can match the disparity of the cropped images such that magnified view has disparity corresponding to the desired disparity to provide a selected depth of field.

After block 767, the method can return to blocks 761, 762, and/or 765. For example, the method 760 can return to block 761 to select a new stereoscopic pair of the cameras 112 (e.g., based on a changing view point and/or position of the user), or can return to block 762 to receive another set of images from the previously-select pair of the cameras 112. In some embodiments, the method 760 can return to block 765 to update the position of the regions of interest in the cropped images. For example, referring to FIG. 8B, the position of the second regions of interest 854*b* can be moved (e.g., panned and/or dollied) within the cropped regions 652*a-b* as indicated in phantom lines based on, for example, the tracked position of the head-mounted display device 104, the tracked position of the instrument 101, and so on. Therefore, the positioning of the regions of interest can be updated in real-time or near real-time to provide a desired viewpoint to the user. That is, for example, the regions of interest can be panned in the direction of the user's head motion as the user moves their head within the scene 108. In some aspects of the present technology, if there is sufficient overlap between the cameras 112, the method 760 can operate to provide a magnified stereoscopic view of the scene 108 that is continuously updated to match the viewpoint of the head-mounted display device 104 as it moves through the scene 108 by updating (i) the pair of the cameras 112 selected to provide the stereoscopic view and (ii) the position of the regions of interest within the source images received from a selected pair of the cameras 112.

III. SELECTED EMBODIMENTS OF GENERATING COMBINED STEREOSCOPIC AND RECONSTRUCTED THREE-DIMENSIONAL (3D) VIEWS FROM A MULTICAMERA ARRAY

As described in detail above, the system 100 can (i) generate/reconstruct a synthetic view of the scene 108 corresponding to a desired viewpoint by combining image data (e.g., light field image data) from multiple ones of the cameras and (ii) generate stereoscopic views of the scene 108 based on images received from selected pairs of the cameras 112 and cropped to match a desired disparity to provide a desired depth of field. In some embodiments, such synthetic/combined views can be more computationally complex to generate and/or of poorer image quality than such stereoscopic views. However, stereoscopic views can be limited by the positioning of the cameras 112 and their overlap, and the views from any selected pair of the cameras 112 are limited in how they can be viewed (e.g., by panning, dollying, or otherwise moving cropped regions within the source images from the cameras). Moreover, stereoscopic views are not true 3D views as they are perspective locked.

Figure 9:
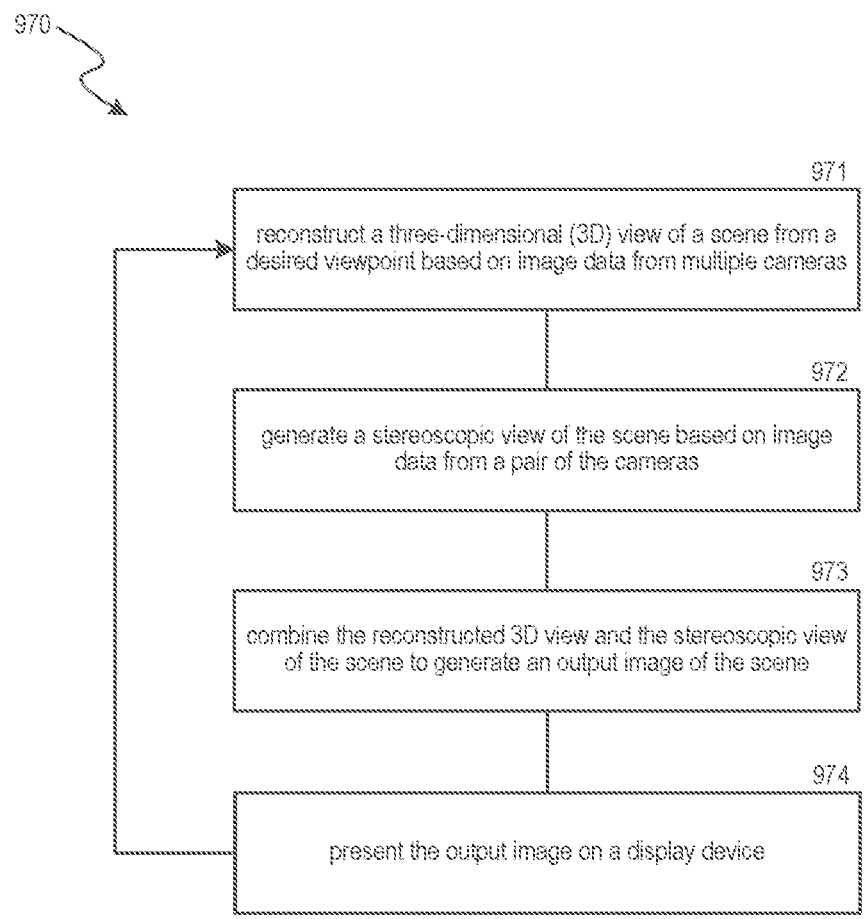
FIG. 9 is a flow diagram of a process or method for generating a view of a scene using the imaging system of FIG. 1 in accordance with additional embodiments of the present technology.

Accordingly, in some embodiments the system 100 can merge/combine a 3D reconstructed view of the scene 108 with stereoscopic images from a selected pair of the cameras 112 to provide a merged view that leverages the benefits of both 3D reconstruction and stereoscopic viewing. For example, FIG. 9 is a flow diagram of a process or method 970 for generating a view of a scene from a multicamera system (e.g., the camera array 110 including the cameras 112) in accordance with embodiments of the present technology. Although some features of the method 970 are described in the context of the embodiments shown in FIGS.

1-8B for illustration, one skilled in the art will readily understand that the method 970 can be carried out using other suitable systems and/or devices described herein.

At block 971, the method 970 can include reconstructing a 3D view of the scene 108 from a desired viewpoint based on image data from multiple ones of the cameras 112. For example, as described in detail above, the image processing device 103 can (i) receive first image data captured by the cameras 112 (e.g., light field images, light field image data, RGB images) and depth information from the depth sensor 114, and (ii) process the image data and the depth information to synthesize (e.g., generate, reconstruct, render) a three-dimensional (3D) view of the scene 108 corresponding to a virtual camera perspective from the desired viewpoint. In some embodiments, the desired viewpoint corresponds to a position and/or orientation of the head-mounted display device 104 within the scene 108.

At block 972, the method 970 can include generating a stereoscopic view of the scene 108 based on image data from a pair of the cameras 112. The stereoscopic view can be generated via, for example, the method 440 and/or the method 760 described in detail above with reference to FIGS. 4-8B. In some embodiments, the stereoscopic view is from at or near the same viewpoint as the reconstructed 3D view of the scene 108. For example, a pair of the cameras 112 and/or a region of interest within the images from the cameras 112 can be selected based on the position of the head-mounted display device 104 within the scene 108.

At block 973, the method can include combining the reconstructed 3D view of the scene 108 (block 971) and the stereoscopic view of the scene 108 (block 972) to generate an output image of the scene 108. In some embodiments, the stereoscopic view images can be inserted into the 3D view as inserts. For example, each stereoscopic view image can be shown in its own panel (e.g., in a picture-in-picture manner) in the 3D reconstructed view. In some embodiments, the stereoscopic view images can be toggled (e.g., by a user) to selectively replace the 3D reconstructed view. In some embodiments, the stereoscopic view images can be projected onto the 3D topology of the 3D reconstructed view. In some such embodiments, constraints can be set for the motion of the head-mounted display device 104 to reduce motion artifacts in the combined output image.

At block 974, the method 970 can present the output image on the display device 104. In some embodiments, the method 970 can return to block 971 to continuously update the 3D reconstructed view, the stereoscopic view, and/or the combination thereof to provide a real-time or near real-time video view of the scene 108.

IV. ADDITIONAL EXAMPLES

The following examples are illustrative of several embodiments of the present technology:

1. A method for generating a stereoscopic view of a scene, the method comprising:
    selecting a pair of cameras from a plurality of cameras from which to generate the stereoscopic view;
    receiving images of the scene from the pair of the cameras;
    cropping the images based on a known calibration of the cameras and a desired disparity; and displaying the cropped images on a display device to generate the stereoscopic view.

2. The method of example 1 wherein the display device is a head-mounted display device, and wherein selecting the pair of the cameras includes selecting the pair of the cameras based on a position of the head-mounted display device within the scene.

3. The method of example 2 wherein the method further comprises tracking the position of the head-mounted display device within the scene.

4. The method of any one of examples 1-3 wherein the desired disparity corresponds to an interpupillary distance of a user.

5. The method of any one of examples 1-4 wherein the desired disparity is between about between about 54-74 millimeters.

6. The method of any one of examples 1-5 wherein the images received from the pair of the cameras have a higher resolution than a resolution of the display device.

7. The method of any one of examples 1-6 wherein the cameras are mounted to a common frame.

8. The method of example 7 wherein the known calibration includes a relative position and orientation of the cameras relative to one another.

9. The method of example 7 or example 8 wherein the cameras each include a focal axis, and wherein the focal axes of the cameras converge.

10. The method of any one of examples 7-9 wherein plurality of cameras includes four or more cameras.

11. A method of generating a magnified stereoscopic view of a scene, the method comprising:
    selecting a pair of cameras from a plurality of cameras from which to generate the stereoscopic view;
    receiving images of the scene from the pair of the cameras;
    cropping the images based on a known calibration of the cameras and a desired disparity;
    determining a region of interest in the cropped images;
    cropping each of the cropped images to the region of interest; and
    displaying the regions of interest on a display device to generate the magnified stereoscopic view.

12. The method of example 11 wherein the display device is a head-mounted display device, and wherein determining the region of interest in the cropped includes determining the region of interest based on the position of the head-mounted display device within the scene.

13. The method of example 11 or example 12 wherein the desired disparity corresponds to an interpupillary distance of a user.

14. The method of any one of examples 11-13 wherein the method further comprises scaling up a resolution of the images received from the pair of the cameras.

15. The method of any one of examples 11-14 wherein scaling up the resolution of the images includes scaling up the resolution using a super-resolution process.

16. The method of any one of examples 11-15 wherein the known calibration includes a relative position and orientation of the cameras relative to one another, wherein the plurality of cameras includes four or more cameras, wherein the cameras each include a focal axis, and wherein the focal axes of the cameras converge.

17. The method of example 16 wherein the desired disparity corresponds to an interpupillary distance of a user.

18. A method of generating a view of a scene, the method comprising:
    receiving image data from a plurality of cameras;
    reconstructing a three-dimensional (3D) view of the scene from a desired viewpoint based on the image data;
    selecting a pair of the cameras;
    receiving images from the selected pair of the cameras;

generating a stereoscopic view of the scene based on the received images;

combining the 3D view of the scene and the stereoscopic view of the scene to generate an output image of the scene; and displaying the output image on a display device.

19. The method of example 18 wherein the display device is a head-mounted display device, wherein the viewpoint is from a position and orientation of the head-mounted display device within the scene, and wherein selecting the pair of the cameras is based on the position of the head-mounted display device within the scene.

20. The method of example 18 or example 19 wherein the method further comprises cropping the images received from the selected pair of the cameras based on a known calibration of the cameras and a desired disparity, wherein the desired disparity corresponds to an interpupillary distance of a user, and wherein generating the stereoscopic view of the scene is based on the cropped images.

V. CONCLUSION

The above detailed description of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A method for generating a stereoscopic view of a scene including a surgical object, the method comprising:

tracking a position of an instrument through the scene with multiple trackers;

based on the position of the instrument in the scene, selecting a pair of cameras from a set of more than two cameras from which to generate the stereoscopic view by selecting a first camera and a second camera from the set of more than two cameras that are nearest to the position of the instrument and/or that have a best view of the position of the instrument, wherein the cameras each have a focal axis, wherein the focal axes converge within the scene, wherein the cameras and the trackers are mounted to a common frame to each have a fixed location and orientation relative to one another, wherein the cameras and the trackers each have a field of view of the scene including the surgical object, and wherein the fields of view at least partially overlap;

receiving images of the scene from the pair of the cameras;

cropping the images based on a known calibration of the cameras and a viewing plane at which the focal axes of the cameras are separated by a desired disparity; and displaying the cropped images on a display device to generate the stereoscopic view, wherein the display device is separate and spaced apart from the cameras.

2. The method of claim 1 wherein the desired disparity corresponds to an interpupillary distance of a user.

3. The method of claim 1 wherein the desired disparity is between about 54-74 millimeters.

4. The method of claim 1 wherein the images received from the pair of the cameras have a higher resolution than a resolution of the display device.

5. The method of claim 1 wherein the known calibration includes a relative position and orientation of the cameras relative to one another.

6. The method of claim 1 wherein the set of more than two cameras includes four or more cameras.

7. The method of claim 1 wherein the pair of the cameras is separated by a first distance, and wherein the focal axes are separated by a second distance along the viewing plane smaller than the first distance.

8. The method of claim 1 wherein selecting the pair of the cameras comprises selecting the first camera and the second camera from the set of more than two cameras that are nearest to the position of the instrument.

9. The method of claim 1 wherein selecting the pair of the cameras comprises selecting the first camera and the second camera from the set of more than two cameras that have a best view of the instrument.

10. The method of claim 1 wherein the display device is a head-mounted display device.

11. The method of claim 10 wherein the method further comprises tracking the position of the head-mounted display device within the scene.

12. A method of generating a magnified stereoscopic view of a scene, the method comprising:

tracking a position of an instrument through the scene with multiple trackers;

based on the position of the instrument in the scene, selecting a pair of cameras from a set of more than two cameras from which to generate the stereoscopic view by selecting a first camera and a second camera from the set of more than two cameras that are nearest to the position of the instrument and/or that have a best view of the position of the instrument, wherein the cameras each have a focal axis, wherein the focal axes converge within the scene, wherein the cameras and the trackers are mounted to a common frame to each have a fixed location and orientation relative to one another, wherein the cameras and the trackers each have a field of view, and wherein the fields of view at least partially overlap;

receiving images of the scene from the pair of the cameras;

cropping the images based on a known calibration of the cameras and a viewing plane at which the focal axes of the cameras are separated by a desired disparity;

determining a region of interest in the cropped images;

cropping each of the cropped images to the region of interest; and displaying the regions of interest on a display device to generate the magnified stereoscopic view, wherein the display device is separate and spaced apart from the cameras.

13. The method of claim 12 wherein the display device is a head-mounted display device, and wherein determining the region of interest in the cropped includes determining the region of interest based on the position of the head-mounted display device within the scene.

14. The method of claim 12 wherein the desired disparity corresponds to an interpupillary distance of a user.

15. The method of claim 12 wherein the method further comprises scaling up a resolution of the images received from the pair of the cameras using a super-resolution process.

16. The method of claim 12 wherein the known calibration includes a relative position and orientation of the cameras relative to one another, wherein the plurality of cameras includes four or more cameras, and wherein the desired disparity corresponds to an interpupillary distance of a user.

17. A method of generating a view of a scene, the method comprising:

receiving image data from a set of more than two cameras;

reconstructing a three-dimensional (3D) view of the scene from a desired viewpoint based on the image data;

tracking a position of an instrument through the scene with multiple trackers;

based on the position of the instrument, selecting a pair of the cameras by selecting a first camera and a second camera from the set of more than two cameras that are nearest to the position of the instrument and/or that have a best view of the position of the instrument, wherein the cameras each have a focal axis, wherein the focal axes converge within the scene, wherein the cameras and the trackers are mounted to a common frame to each have a fixed location and orientation relative to one another, wherein the cameras and the trackers each have a field of view, and wherein the fields of view at least partially overlap;

receiving images from the selected pair of the cameras;

cropping the images based on a known calibration of the cameras and a viewing plane at which the focal axes of the cameras are separated by a desired disparity generating a stereoscopic view of the scene based on the cropped images;

combining the 3D view of the scene and the stereoscopic view of the scene to generate an output image of the scene; and displaying the output image on a display device, wherein the display device is separate and spaced apart from the cameras.

18. The method of claim 17 wherein the display device is a head-mounted display device, and wherein the viewpoint is from a position and orientation of the head-mounted display device within the scene.

19. The method of claim 17 wherein the desired disparity corresponds to an interpupillary distance of a user.

* * * * *